(12) United States Patent
Cho et al.

(10) Patent No.: US 6,774,199 B2
(45) Date of Patent: Aug. 10, 2004

(54) POLYMER HAVING SWITCHABLE TACKINESS

(75) Inventors: Kilwon Cho, Pohang-si (KR); Jeongho Cho, Pohang-si (KR); Jongchan Lee, Seoul (KR)

(73) Assignee: Postech Foundation (KR)

( * ) Notice: Subject to any disclaimer, the term of this patent is extended or adjusted under 35 U.S.C. 154(b) by 0 days.

(21) Appl. No.: 10/269,431

(22) Filed: Oct. 11, 2002

(65) Prior Publication Data

US 2003/0232924 A1 Dec. 18, 2003

(30) Foreign Application Priority Data

Jun. 18, 2002 (KR) .......................... 2002-34063

(51) Int. Cl.[7] .............................................. C08G 77/22
(52) U.S. Cl. .......................... 528/30; 528/10; 528/42; 528/421; 526/319; 526/323
(58) Field of Search .............................. 528/10, 30, 42, 528/421; 526/319, 323

(56) References Cited

PUBLICATIONS

Tang et al., Journal of Mass Spectrometry, vol. 31, (1996), 926–936.*

* cited by examiner

*Primary Examiner*—Kuo-Liang Peng
(74) *Attorney, Agent, or Firm*—Anderson Kill & Olick, P.C.

(57) ABSTRACT

The present invention relates to a polymer of formula (I), which has a liquid crystalline side chain and exhibits switchable tackiness at a narrow temperature range around its isotropic transition temperature:

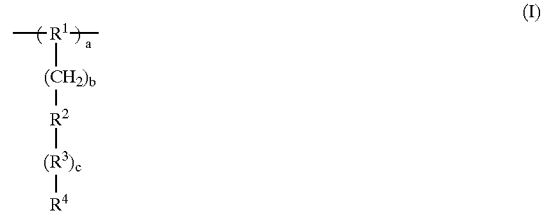

(I)

wherein, $R^1$ is

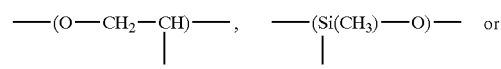

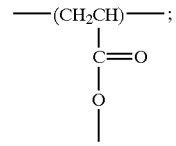

$R^2$ is selected from the group consisting of $-SO_2-$, $-C(O)-$, $-CH(COOH)-$, $-C(COOH)_2-$, $-C(S)-$ and $-C(NH)-$;

$R^3$ is $-CH_2-$ or $-CF_2-$;

$R^4$ is H or F;

a is an integer ranging from 30 to 500;

b is an integer ranging from 1 to 3; and c is an integer ranging from 3 to 20.

8 Claims, 1 Drawing Sheet

POLYMER HAVING SWITCHABLE TACKINESS

FIELD OF THE INVENTION

The present invention relates to a novel side-chain liquid crystalline polymer having a temperature-dependent switchable tack property.

BACKGROUND OF THE INVENTION

Tackiness is the ability of the surface of a material to adhere instantaneously to the surface of another material when the two materials are brought into contact with each other under a light applied pressure.

The preparation of conventional adhesives has been relied mainly on macroscopic and bulk techniques, i.e., blending various polymers and additives. However, such materials are not suitable for forming engineered interfaces which require special properties at specific processing conditions. For example, adhesives used in semiconductor dicing or grinding process, or in some biomedical processes, require switchable tackiness, an adhesive property that changes reversibly with the change of temperature, pressure or pH within a narrow range. In order to obtain an adhesive having such switchable tackiness, the molecular structure of the adhesive has to be designed to confer specific surface and viscoelastic properties thereon.

A side-chain liquid crystalline polymer undergoes a dramatic change from a highly structured state to a disordered state at its isotropic transition temperature and such a change over a narrow temperature range results in an abrupt change in its viscoelastic properties. Further, the surface properties of such a polymer would also undergo a sharp change at around the transition temperature, when the side chain and main chain thereof have different physicochemical characteristics relevant to the surface energy, unlike a conventional adhesive polymer whose viscoelastic property changes gradually over a broad temperature range.

Accordingly, the present inventors have endeavored to develop an adhesive polymer having tack properties that change sharply at a narrow temperature range.

SUMMARY OF THE INVENTION

It is, therefore, an object of the present invention to provide a side-chain liquid crystalline polymer which exhibits switchable tackiness at a narrow temperature range.

In accordance with one aspect of the present invention, there is provided a polymer of formula (I):

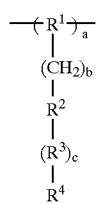

(I)

wherein,
$R^1$ is

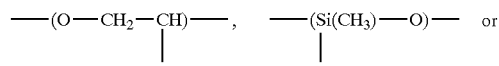

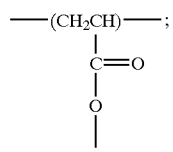

$R^2$ is selected from the group consisting of $-SO_2-$, $-C(O)-$, $-CH(COOH)-$, $-C(COOH)_2-$, $-C(S)-$ and $-C(NH)-$;

$R^3$ is $-CH_2-$ or $-CF_2-$;

$R^4$ is H or F;

a is an integer ranging from 30 to 500;

b is an integer ranging from 1 to 3; and c is an integer ranging from 3 to 20.

BRIEF DESCRIPTION OF THE DRAWINGS

The above and other objects and features of the present invention will become apparent from the following description thereof, when taken in conjunction with the accompanying drawing which shows.

DETAILED DESCRIPTION OF THE INVENTION

Figure 1:
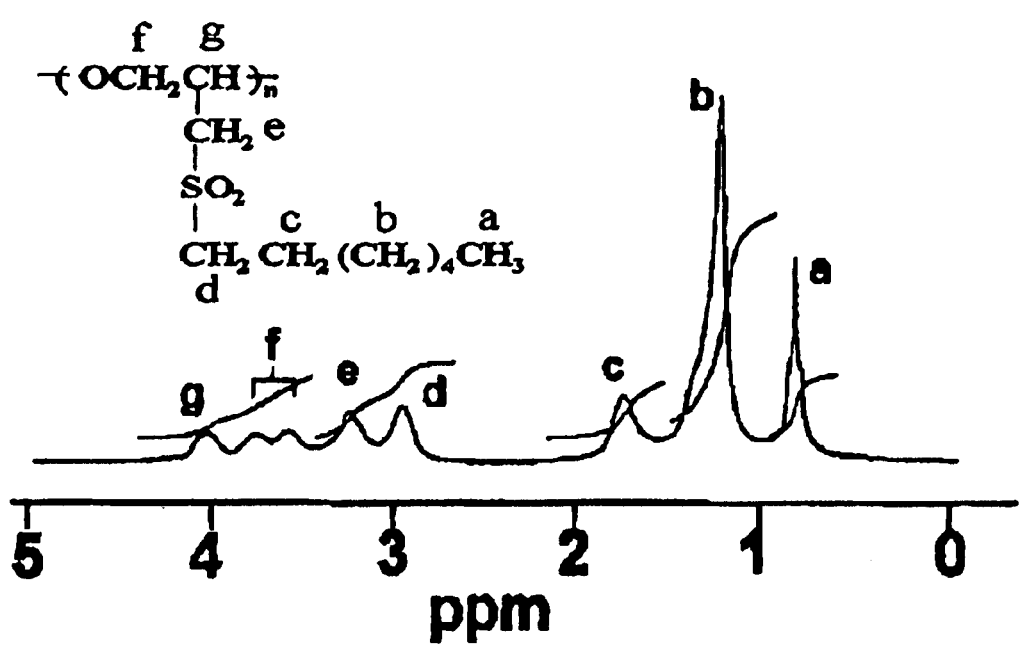
FIG. 1: H-NMR spectrum of poly(oxy(n-heptylsulfonylmethyl)ethylene) obtained in Example 1 of the present invention.

The present invention provides a polymer of formula (I):

(I)

wherein,
$R^1$ is

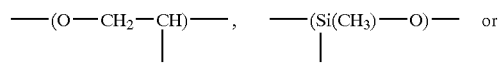

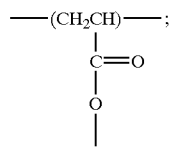

$R^2$ is selected from the group consisting of $-SO_2-$, $-C(O)-$, $-CH(COOH)-$, $-C(COOH)_2-$, $-C(S)-$ and $-C(NH)-$;

$R^3$ is $-CH_2-$ or $-CF_2-$;

R⁴ is H or F;
a is an integer ranging from 30 to 500;
b is an integer ranging from 1 to 3; and
c is an integer ranging from 3 to 20.

In accordance with a preferred embodiment of the present invention, there is provided a polymer of formula (II):

wherein,
n is an integer ranging from 30 to 500, and m is an integer ranging from 3 to 20.

The inventive side-chain liquid crystalline polymer comprises both hydrophilic and hydrophobic moieties.

The polymer of the present invention has a main chain ($R^1$) selected from the group consisting of oxyethylene

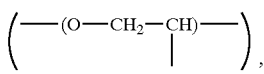

siloxy

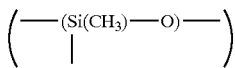

and oxycarbonylethylene

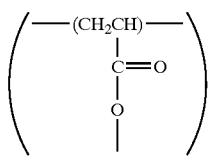

group, preferably oxyethylene group.

The hydrophobic segment of the side chain is formed of alkylene (—$CH_2$—), fluorinated alkylene (—$CF_2$—) or a combination thereof, preferably alkylene chain (—$CH_2$—).

The polymer of the present invention has a polar segment in its side-chain ($R^2$), —$SO_2$— (sulfonyl), —C(O)— (carbonyl), —CH(COOH)— (carboxycarbyl), —C(COOH)$_2$— (dicarboxycarbyl), —C(S)— (thiocarbonyl) or —C(NH)— (iminocarbyl) group, preferably sulfonyl group, which can interact with each other under a specific condition.

The isotropic transition temperature ($T_i$) of the polymer of formula (I) may be controlled by adjusting substituents $R^1$, $R^2$, $R^3$ and $R^4$ and parameters a, b and c.

At around its isotropic transition temperature, the inventive polymer undergoes a reversible transition between a liquid crystalline state and an amorphous state, wherein the term "isotropic transition temperature" refers to said phase-transition temperature.

The surface properties of the polymer of formula (I) thus become dependent on the temperature change around the isotropic transition temperature. The side-chain of the polymer of formula (I) has a hydrophobic end group [($R^3$)-($R^4$)] which extends outward from the surface thereof at below the isotropic transition temperature, thereby imparting hydrophobicity thereto. At above the isotropic transition temperature, various segments of the polymer become random and unoriented, and the polymer becomes amorphous, exposing the main chain of high surface energy at the surface. That is, at above the isotropic transition temperature, the polymer attains a hydrophilic surface. Thus, the surface of the polymer changes dramatically from hydrophobic to hydrophilic at around the isotropic transition temperature with a consequential sharp change in the viscoelasticity of the polymer. Such changes in surface and viscoelastic properties at around the isotropic transition temperature are responsible for the dramatic changes in tackiness of the inventive polymer.

Referring to the preferred embodiment defined by the polymer of formula (II), the interaction between sulfonyl groups exists below the isotropic transition temperature, with consequential orientation of the terminal alkylene group at the surface of the polymer, thereby conferring surface hydrophobicity thereto. At above the isotropic transition temperature, the sulfonyl and ethylene oxide moieties having high surface energies become exposed at the surface, to give surface hydrophilicity thereto.

Accordingly, the polymer of the present invention whose adhesive and viscoelastic properties can be easily changed by controlling the temperature, may be used as a reversible and versatile adhesive at above $T_i$, and can be easily removed from a substance adhered thereto when the temperature is lowered to $T_i$ or below; and therefore, the polymer can be used repeatedly in reversible manner and permanently by controlling the temperature.

The present invention is further described and illustrated in Examples provided below, which are, however, not intended to limit the scope of the present invention.

EXAMPLE

Preparation of poly(oxy(n-heptylsulfonylmethyl)ethylene)

323.4 mmol of sodium n-heptanethiolate was added to 1.8 mmol (1.7 g) of poly(oxy(chloromethyl)ethylene) dissolved in 100 ml of dimethylacetate at 80° C. and stirred for 30 minutes. 1 g of the poly(oxy(n-heptylthiomethyl)ethylene) product was dissolved in 35 ml of trichloromethane and cooled to 0° C. Then, 14.8 mmol of meta-chloroperbenzoic acid was added thereto to obtain poly(oxy(n-heptylsulfonylmethyl)ethylene).

The H-NMR spectrum of the polymer thus prepared is shown in FIG. 1. The glass and isotropic transition temperatures thereof were measured with a differential scanning calorimeter (DSC). The result is shown in Table I.

TABLE I

| Temp Program Cycle | Glass Transition Temp ($T_g$) | Isotropic Transition Temp ($T_i$) |
| --- | --- | --- |
| Up | 55° | 125° |
| Down | 54° | 124° |

<Physical Properties>

The above polymer was coated on a Si wafer by spin-casting and the contact angle of a glycerol drop applied to the surface was determined to obtain a relative measure of the surface hydrophilicity: As contact angle decreases, the hydrophilicity increases. The result is shown in Table II.

TABLE II

| Temp Program Cycle | Temp (° C.) | Contact Angle (°) |
|---|---|---|
| Up | 90 | 94.7 |
|  | 110 | 95.1 |
|  | 120 | 95.6 |
|  | 123 | 94.8 |
|  | 127 | 75.8 |
|  | 130 | 55.9 |
|  | 140 | 50.3 |
|  | 150 | 49.5 |
| Down | 140 | 51.7 |
|  | 130 | 53.2 |
|  | 127 | 67.3 |
|  | 123 | 95.4 |
|  | 120 | 96.1 |
|  | 110 | 95.6 |
|  | 90 | 96.2 |

The result in Table II shows that with increasing temperature, the contact angle decreases and that the surface hydrophilicity undergoes a dramatic change at around the isotropic transition temperature (125° C.).

Further, the tack property of the polymer as function of temperature was measured according to the method of ASTM D 2979-95. The result is represented in Table III.

TABLE III

| Temp Program Cycle | Temp (° C.) | Adhesive Strength (g) |
|---|---|---|
| Up | 90 | 3.6 |
|  | 110 | 4.2 |
|  | 120 | 7.6 |
|  | 123 | 10.4 |
|  | 127 | 440.6 |
|  | 130 | 461.5 |
|  | 140 | 472.3 |
|  | 150 | 478.6 |
| Down | 140 | 475.6 |
|  | 130 | 462.9 |
|  | 127 | 450.4 |
|  | 123 | 8.4 |
|  | 120 | 7.6 |
|  | 110 | 5.9 |
|  | 90 | 5.2 |

As can be seen in Table III, the adhesive characteristics of the present polymer change dramatically at a narrow temperature range of 123 to 127° c, i.e., around the isotropic transition temperature (125° C.), at both temperature program cycles. Therefore, such polymer has temperature-dependent switchable adhesive properties.

The switchable tack property of the polymer of the present invention thus determined is characteristically different from the property of a conventional polymer which changes over a wide temperature range.

While the subject invention have been described and illustrated with respect to the preferred embodiments only, various changes and modifications may be made therein without departing from the essential concept of the present invention which should be limited only by the scope of the appended claims.

What is claimed is:

1. A polymer of formula (I):

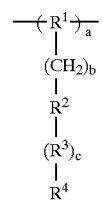

wherein,

R$^1$ is

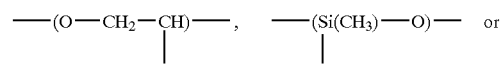

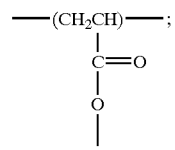

R$^2$ is selected from the group consisting of —SO$_2$—, —C(O)—, —CH(COOH)—, —C(COOH)$_2$—, —C(S)— and —C(NH)—;
R$^3$ is —CH$_2$— or —CF$_2$—;
R$^4$ is H or F;
a is an integer ranging from 30 to 500;
b is an integer ranging from 1 to 3; and
c is an integer ranging from 3 to 20.

2. The polymer of claim 1, wherein R$^1$ is

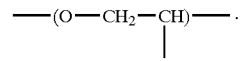

3. The polymer of claim 1, wherein R$^2$ is —SO$_2$—.
4. The polymer of claim 1, wherein R$^3$ is —CH$_2$—.
5. An adhesive composition comprising a compound of claim 1 as an adhesive substance.
6. An adhesive composition comprising a compound of claim 2 as an adhesive substance.
7. An adhesive composition comprising a compound of claim 3 as an adhesive substance.
8. An adhesive composition comprising a compound of claim 4 as an adhesive substance.

* * * * *